March 17, 1953   H. E. REVERCOMB ET AL   2,632,090
HIGH-FREQUENCY CAVITY HEATER
Filed April 21, 1948   3 Sheets-Sheet 1

Inventors:
Henry E. Revercomb,
Philip W. Morse,
by Claude A. Mott.
Their Attorney.

Inventors:
Henry E. Revercomb,
Philip W. Morse,
by Claude A. Mott
Their Attorney.

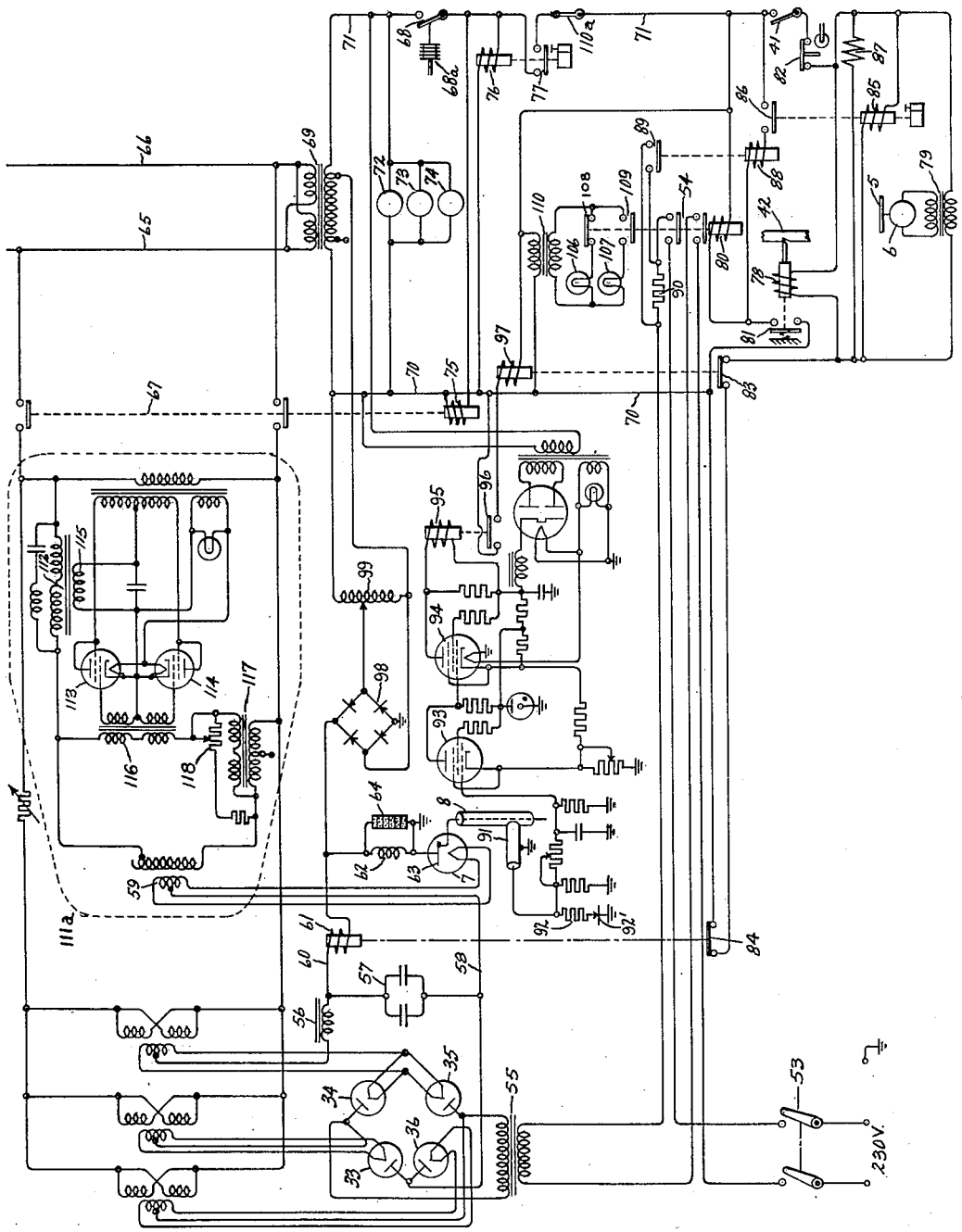

Patented Mar. 17, 1953

2,632,090

UNITED STATES PATENT OFFICE 2,632,090

HIGH-FREQUENCY CAVITY HEATER

Henry E. Revercomb, North Syracuse, and Philip W. Morse, Elnora, N. Y., assignors to General Electric Company, a corporation of New York Application April 21, 1948, Serial No. 22,468

13 Claims. (Cl. 219—47)

Our invention relates to high frequency heaters, more particularly to such heaters employing a cavity or chamber of conducting material in which standing electromagnetic waves are produced, and has for its object a heater for quickly and uniformly heating materials, such as foods, to a desired temperature.

Our present invention is an improvement over the invention of the application of George W. Schroeder, Serial No. 12,998, filed March 4, 1948, and assigned to the same assignee as the present application. The invention of George W. Schroeder was made prior to our invention, and we, therefore, do not herein claim anything shown or described in the said Schroeder application, which is to be regarded as prior art with respect to this present application.

Our invention is particularly useful in the heating of frozen cooked meals which consists of a cardboard or ceramic plate provided with or without compartments in which portions of the meat and vegetables comprising the meal are placed after being cooked, the meal then being frozen and stored for future use. In the operation of a typical heater embodying our invention, a frozen cooked meal was taken out of the storage refrigerator where it was maintained at a temperature of approximately zero degree Fahrenheit, placed in the heater and heated uniformly throughout to a temperature of approximately 170 degrees F. in seventy seconds. The food was restored to its original cooked condition without impairment of its flavor or other characteristics, except for some dehydration.

In carrying out our invention in one form, we provide a chamber or cavity having walls made of electrically conducting material in which standing electromagnetic waves are produced in accordance with a predetermined pattern or mode by means of power supplied to the cavity from an ultrahigh frequency generator having a frequency of 1050 megacycles. Inside the chamber is a turntable rotating at a predetermined slow speed on which the frozen meal is placed. The cavity is then closed by a sliding door whereby the heating operation is automatically started and, at the end of a predetermined heating period, the power is cut off and the door opened so that the heated meal can be removed.

Figure 1:
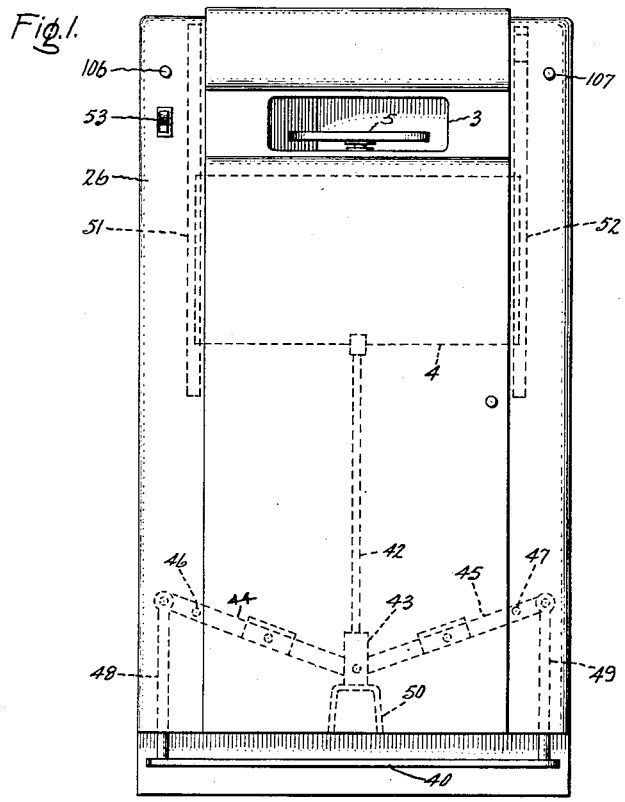
Figure 2:
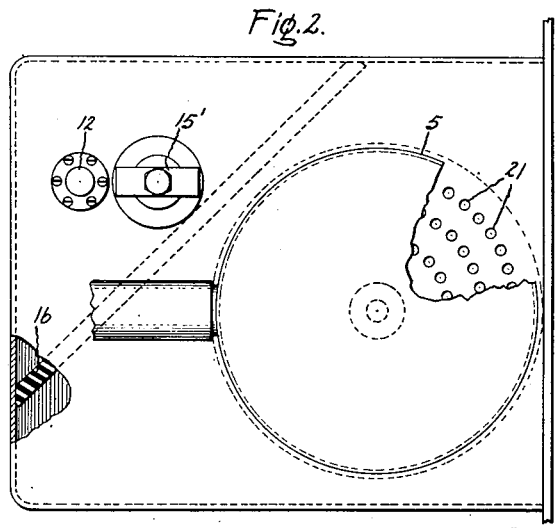
Figure 3:
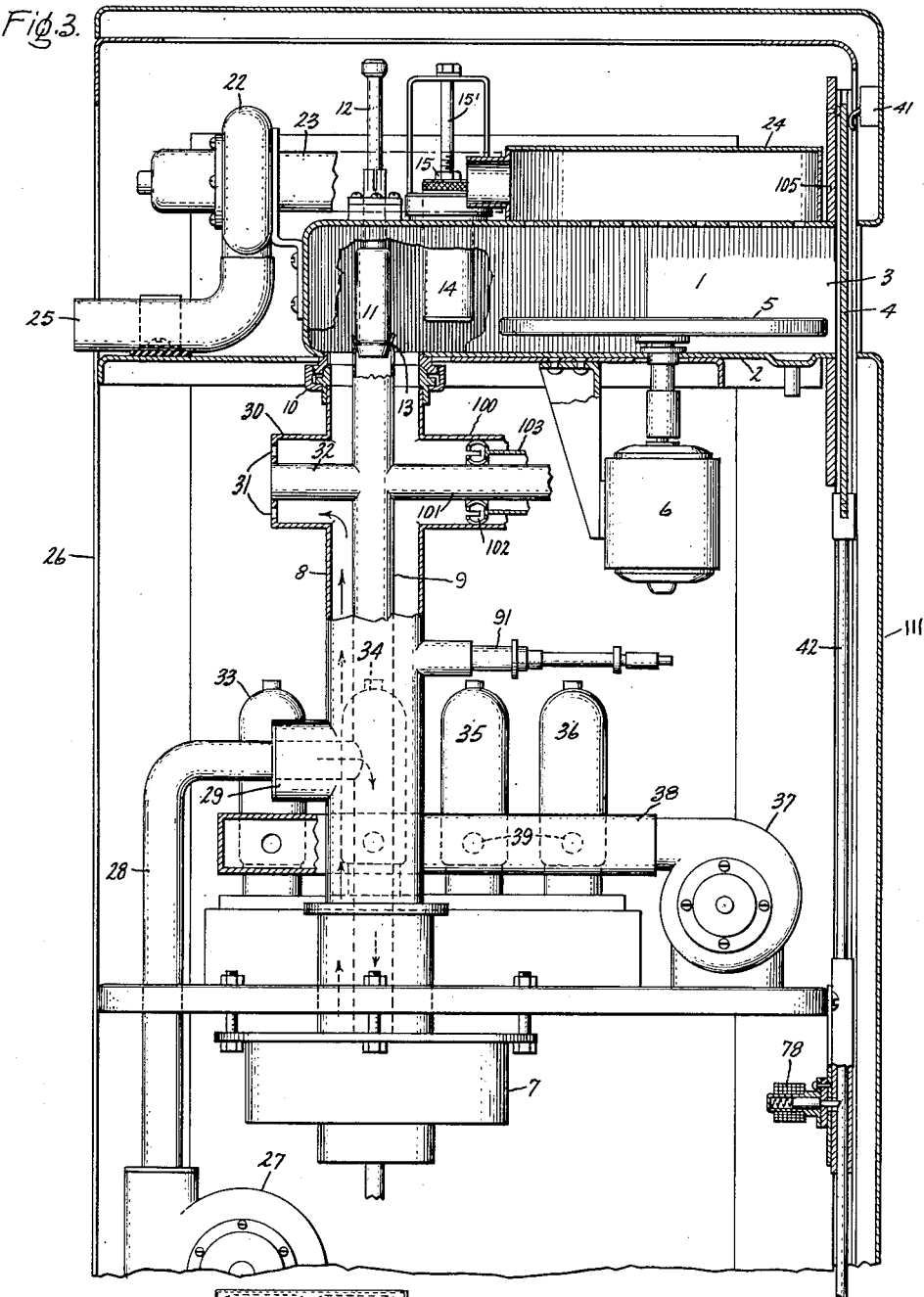
Figure 4:
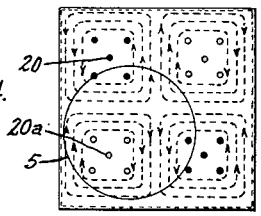

For a more complete understanding of our invention, reference should be had to the accompanying drawing, Fig. 1 of which is a front elevation view of a high frequency heater embodying our invention, Fig. 2 is an enlarged plan view partly in section of the heating chamber, or cavity, utilized in the heater shown in Fig. 1, Fig. 3 is an enlarged partial vertical sectional view of the heater shown in Fig. 1, Fig. 4 is a diagrammatic view showing the no load electromagnet field pattern set up in the heating chamber, while Fig. 5 is a diagrammatic representation of the power and load electric circuits for the heater.

Referring to the drawing, we have shown our invention in one form as applied to a heater for heating pre-cooked frozen meals provided with a rectangular horizontally disposed heating chamber, or cavity, 1 formed by walls 2 made of a suitable electrically conducting material such as copper and provided with a front opening 3 which may be closed by means of a vertically sliding door 4 made of the same material as the walls of the heating chamber. Inside the chamber is a horizontal turntable 5 made of low loss dielectric material driven during the heating operation at a suitable slow speed, such as 20 R. P. M. by an electric motor 6 located just below the chamber. As shown in Fig. 2, the turntable 5 is positioned with its substantially vertical axis spaced from the vertical center line of the chamber, this positioning being for the purpose of obtaining uniform heating by the field pattern or mode set up in the chamber.

High frequency power is supplied to the chamber from an electronic high frequency generator 7 of the magnetron type through a coaxial supply line comprising an outer tubular conductor 8 and an inner tubular conductor 9. The outer conductor 8 is mechanically connected tightly to the lower wall of the chamber by means of a coupling 10 at a point appropriate to the field pattern shown in Fig. 4. As shown, the magnetron generator 7 is located directly underneath the heating chamber with the coaxial power line 8, 9 extending vertically upward to the chamber. For power matching purposes, the length of the inner conductor 9 which extends into the chamber and serves as a power transmitting probe can be adjusted by moving an electrically conducting plug 11 constituting the end of the probe into and out of the end of the conductor 9, this adjustment being made externally of the chamber by means of a rod 12 made of low loss dielectric material, such as polystyrene, low loss glass, etc., extending through the upper wall of the chamber and having its lower end connected to the plug 11. The tubular conductor 9 and the plug 11 are electrically connected by spring contact fingers 13.

An additional load matching adjustment is provided by a plug 14 made of electrically conducting material which extends downward through the upper wall of the chamber and may be adjusted vertically by turning plug 14 after loosening the lock nut 15 on a bolt 15' supporting the plug. A partition 16 made of low loss dielectric material extends across one corner of the heating chamber, this being the corner in which the power supply connections and the load matching plug 14 are located. This partition fits tightly against the walls of the heating chamber and serves to prevent access of vapor in the heating chamber to the coaxial line 8, 9 and the magnetron generator.

As shown in Fig. 4, we preferably maintain in the heating chamber a transverse electric field pattern or mode $H_{0,2,2}$. In Fig. 4 the dotted lines indicate the substantially horizontal lines of magnetic field whose arbitrarily selected polarity is indicated by the arrows, while the solid and open dots 20 and 20a indicate the electric field, the solid and open dots indicating the heads and tails respectively of arrows indicating the direction of the substantially vertical electric flux. It will be understood that this field mode is that maintained in the chamber when it is without heating load and that the heating load will disturb it somewhat. This field mode requires a vertical inside dimension of the chamber which is less than one half of the wave length existing in the chamber during the heating operation, i. e., when the chamber is loaded. This loaded wave length normally is considerably less than the wave length in air of the magnetron generator. Moreover, for the existence of this mode, the two horizontal dimensions of the chamber must each be greater than one wave length but less than one and one-half wave length when the chamber is loaded. In a typical device embodying our invention, the inside dimensions of the chamber were: vertical 4 inches, front to back 16 inches, and across the front 14¾ inches. It will be noted that the coaxial line is connected to the lower wall of the chamber at a point between the high voltage electric field point 20 and the cavity wall. The plunger 14 is concentric with the high voltage point indicated by the center dot 20. In this typical heater, the power was supplied by the generator 7 at a frequency of 1050 megacycles.

Steam and vapor are withdrawn from the heating chamber through a series of apertures 21 in its upper wall by means of a motor-driven blower 22 connected through a duct 23 to a cylindrical cap 24 fitting on the outside of the chamber over the holes 21, the vapors being exhausted at the back of the heater through a duct 25. As shown in the drawing, the heating chamber and all of the power generating and heating cycle control equipment are mounted in a rectangular cabinet formed by metal walls 26.

Cooling air is circulated over the output glass seal (not shown) of the magnetron 7 by means of a motor-driven blower 27 connected by an inlet duct 28 and a quarter-wave supporting stub 29 to the inner tubular conductor 9. The air flows from the duct 28 downward through the conductor 9, over the magnetron output seal, and into the outer tubular conductor 8 through which it passes up to a second quarter-wave supporting stub 30 where it escapes through a plurality of apertures 31.

Primarily, the coaxial stubs 29 and 30 serve as supports for the inner conductor 9 whereby it is held in coaxial relation to the outer conductor 8. In the stub 30, the inner tubular coaxial conductor 32 has an electrical length of approximately one-quarter wave length for the frequency used. The outer end of the duct 32 joins with the outer end of a concentric short tubular conductor having the same diameter as the conductor 8 and connected to and communicating with the conductor 8. Stub 29 is the same length as stub 30 and serves in the same manner as a quarter-wave stub support for the inner conductor 9 so that there are no appreciable reflections of power in the transmission line due to these stub supports. This form of mechanical support for the inner conductor has been found by us to be more reliable than supports made of electrically insulating material because it is not deleteriously affected by high voltages and foreign material such as dust and grease, and furthermore does not set up standing waves.

Cooling air for four power rectifier tubes 33, 34, 35 and 36 is provided by a motor-driven blower 37 which forces cooling air through a duct 38 provided with discharge apertures 39 adjacent the rectifiers.

On the front of the heater as shown in Fig. 1 is a treadle 40 which may be depressed by the operator to raise the door 4 into the heating position shown in Fig. 3 while, at the same time, closing a biased open switch 41 operated by the door to start the heating operation. The door is connected to the treadle 40 by means of a rod 42 extending downward to a connection member 43 to which two lever arms 44 and 45 are pivotally connected and in turn pivoted at the points 46 and 47 with their outer ends connected to the treadle by means of rods 48 and 49. A stop 50 is provided for the member 43 when the door is open, the door being biased by its own weight to the open position. Suitable vertical guides 51 and 52 are provided for the door at its opposite sides.

Referring to Fig. 5, alternating current power is supplied to the heater through a circuit breaker 53, a contactor 54, and a transformer 55 which in a typical heater stepped up the 230 volt supply voltage to substantially 5000 volts. From the transformer, the power is supplied through a two-way rectifier formed by the tubes 33 to 36, inclusive, from which the rectified current passes through a filter comprising a choke coil 56 and a capacitor 57. This filter serves to smooth out the pulsating direct current and reduce its ripple to about five per cent for the magnetron 7. The negative direct current conductor 58 then runs to the cathode of the magnetron through secondary coil 59 of the cathode heating transformer. The positive direct current supply conductor 60 connects with an overload relay coil 61, the circuit continuing through the coil and the electromagnet exciting coil 62 of the magnetron to its anode 63. A non-linear resistor 64 made of a material having a high non-linear voltage resistivity characteristic, such as described in U. S. Patent 1,822,742 to McEachron, dated September 8, 1931, is connected across the magnet coil 62 for the purpose of preventing excessive voltages across the magnet coil.

Power for the cathodes of the magnetron and the rectifiers is supplied from 230 volt alternating current mains 65 and 66 through a contactor 67 and suitable transformers as shown on the drawing.

In the operation of the heater, power will normally be supplied to the mains 65 and 66 and water will be supplied under a suitable pressure for cooling the magnetron plate through a supply pipe (not shown), the water pipe being connected also to a water flow responsive bellows 68a which is connected to a Venturi system (not shown) in the water supply circuit so as to close a switch 68 in response to normal water flow. From the mains 65 and 66, power is supplied through a suitable transformer 69 to the control mains 70 and 71. Connected directly across the mains 70 and 71 are the three electric motors 72, 73 and 74, which operate the blowers 22, 27 and 37, respectively. With the switch 68 held closed by the cooling water flow, the coil 75 is energized for closure of the contactor 67 whereby power is supplied to heat the cathodes of the magnetron and the rectifiers. Also, at this time, the coil 76 is energized to close a switch 77 after a predetermined time interval during which the cathodes of the magnetron and rectifiers heat.

The heater is now ready to be started immediately after a frozen meal or other food or material to be heated is placed on the turntable 5 and the door has been closed by means of the treadle 40 thereby to close the control switch 41 through which power is supplied to close the contactor 54 for the supply of high voltage direct current to the magnetron. At that time, a coil 78 is energized to latch the door closed and the motor 6 is energized through a suitable transformer 79 to rotate the turntable 5. The circuits may be traced as follows:

For the coil 80 of the contactor 54, from supply main 71 through the coil and switch 81 which is closed by the coil 78 to the supply conductor 70.

For the door latching coil 78, from the supply main 71 through the switch 41, a time switch 82 which is now closed, the coil 78, a safety switch 83, an overload switch 84, to the supply main 70.

The transformer 79 supplying the motor 6 is connected in parallel with the coil 78 as are also a coil 85 for closing a switch 86 after a predetermined time interval, and a motor-driven timing device 87 connected to open the switch 82 after a predetermined time interval for which the device is set.

The coil 85 closes the switch 86 after a short interval of time, such as a few seconds, whereby the coil 88 is energized to close a switch 89 and short circuit a resistance 90 in series with the primary of the transformer 55. This applies full power to the rectifier and increases the high frequency power supplied to the heating chamber to its maximum value. The heating operation proceeds until after the predetermined heating time, such as seventy seconds, the timer 87 opens the switch 82 whereby the motor 6 is deenergized and the coil 78 deenergized for the release and opening of the door. The deenergization of the coil 78 permits the switch 81 to open and thereby deenergize the coil 80 for opening the contactor 54. Upon the opening of the door, the door switch 41 opens and the heater is now ready for another heating cycle.

It will be noted from an examination of Fig. 4 showing the position of the turntable with respect to the magnetic and electric fields in the chamber that all parts of the frozen meal on the turntable are moved through substantially the same aggregate electro-magnetic field and, consequently, the frozen meal is heated substantially uniformly throughout by integrated heating. It will be understood, however, that, as pointed out above, the magnetic and electric fields as indicated in Fig. 4 are disturbed somewhat by the heating load, i. e., the frozen meal or other material. For materials having power loss characteristics substantially similar to the power loss characteristics of food, we believe that the heating effect of the magnetic field predominates over the heating effect of the electric field.

We have also disclosed a directional coupler protective device 91 which is connected to the outer conductor 8 and is responsive to the direction of flow of power in the conductor to deenergize the magnetron as described and claimed in a copending application, Serial No. 47,194, filed by Henry E. Revercomb on September 1, 1948, assigned to the same assignee as this invention. It is not responsive to the normal flow of power to the heating chamber, but it is responsive to a large amount of reflected power from the heating chamber which would overheat and damage the magnetron. A predetermined amount of reflected power produces a D.-C. voltage across the resistance 92 whereby a tube 93 operates to supply negative grid voltage to a tube 94 whereby a coil 95 theretofore energized is deenergized for closure of a switch 96 and connection of a coil 97 across the supply mains 70 and 71. A crystal voltage limiting device 92' is provided for the resistance 92. The coil 97 opens the protective switch 83 and thereby discontinues the heating operation in substantially the same manner as by opening of the time switch 82.

Prior to the application of direct current to the magnetron and energization of the coil 62 thereby, as previously described, the coil 62 is energized by means of a dry rectifier 98 which is connected through an autotransformer 99 to the secondary of the transformer 69. By means of the rectifier 98, the magnetron is thus magnetized before the high voltage direct current is supplied to it.

For the purpose of an additional means for decreasing the phase angle between the voltage and current waves in the coaxial transmission line 8, 9, we have provided a matching stub consisting of an outer electrically conducting duct 100 connected to the conductor 8 and an inner electrically conducting duct 101 connected to the conductor 9, the two tubular conductors 100 and 101 forming a coaxial line of the same size as the line 8, 9 and connected to the latter at right angles therewith. In the space between the conductors 100 and 101 is a ring-shaped electrically conducting slider 102 provided with spring contact brushes engaging the conductors and forming a short circuit between conductors. This ring may be adjusted manually by means of a rod 103 so as to return a reflected voltage wave to the coaxial line out of phase with the wave reflected from the heating chamber whereby the latter is cancelled in whole or in part with corresponding reduction in the power reflected from the heating chamber. This improves the power match in the heating chamber. It is contemplated that the slider 102 will be adjusted to an appropriate position in the factory so as to correct for a major mismatch in the power system, minor corrections being thereafter made by adjustment of the plug 11 and the plug 14.

Another feature of our invention is the provision of a substantially quarter-wave trap seal for the door 4 when in its closed position. The door is of such size that when it is in closed position, as shown in Fig. 3, it overlaps on all sides the door opening by an amount which is approximately one-quarter wave length for the frequency used. Attached to the chamber around the door opening is a flange 105 having a width also approximately one-quarter wave length for the frequency used. The door, when in its closed position as shown in Fig. 3, is parallel with the flange and spaced slightly, such as one-eighth inch, from the flange. It will be understood that both the door and the flange are made of electrically conducting material, such as copper. This wave trap construction acts as a wave guide with extremely high attenuation and effectively prevents the loss of any appreciable amount of power from the chamber when the door is closed.

We also provide green and red lights, Fig. 5, 106 and 107, which are energized respectively through a normally closed switch 108 and a normally open switch 109 from a transformer 110 connected to the supply mains 70 and 71. The switches 108 and 109 are connected to be operated by the coil 80. When the heater is not in operation, the coil 80 is deenergized and the switch 108 is closed so that the green light shows. When the coil 80 is energized upon operation of the heater, the switch 108 opens and the switch 109 closes to show the red light.

A door interlock switch 110a is shown in the control circuit which switch is held closed normally by the door 111 forming a front panel of the cabinet. This switch is opened in case the door 111 is opened to gain access to the generating and rectifying apparatus whereby deenergization of the apparatus is assured.

For the purpose of controlling the temperature of the magnetron filament or cathode in response to its temperature as indicated by changes in its resistance, we have provided apparatus surrounded by the dotted line 111a (Fig. 5) comprising a saturable reactor 112 in circuit with the transformer 59, the impedance of this reactor being controlled by means of a saturating winding 115 supplied with pulsating direct current from the grid controlled rectifier tubes 113 and 114. The grids of the tubes 113 and 114 are supplied from a transformer 116 which in turn is supplied with an alternating current voltage by means of a transformer 117 and a resistor 118 connected in a modified bridge circuit with the transformer 59, which voltage varies in magnitude and direction or phase with the temperature of the magnetron filament as compared with a predetermined temperature for which this control is adjusted. For example, if the filament is heated to a temperature higher than the predetermined temperature, its resistance increases with a resulting decrease in the current supplied to it and the resulting voltage applied to the transformer 116 is in such direction as to decrease the current supplied to the saturating winding 115. This increases the reactance of the reactor 112 and still further decreases the current supplied to the filament so as to decrease the temperature of the filament.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A high frequency heater comprising walls made of electrically conducting material forming a horizontally disposed rectangular chamber provided with top, bottom and side walls, the vertical dimension of said side walls being smaller than the horizontal dimensions of said top and bottom walls, a high frequency supply source connected to said chamber for producing standing electromagnetic field waves in said chamber in accordance with a predetermined mode for heating a material in said chamber, the said vertical dimension of the said chamber being less than approximately one-half wavelength of said high frequency whereby the said waves provide a substantially vertical electric field, a turntable in said chamber for supporting the material to be heated mounted for rotation about a substantially vertical axis displaced from the center of said chamber thereby to effect uniform heating of the material in said chamber, and motor means connected to rotate said turntable.

2. A high frequency heater comprising walls made of electrically conducting material forming a rectangular chamber, a high frequency supply source connected to said chamber for producing standing electromagnetic field waves in said chamber in accordance with the $H_{0,2,2}$ mode so as to provide a substantially vertical electric field, a turntable in said chamber for supporting the material to be heated mounted for rotation about a substantially vertical axis displaced from the center of said chamber thereby to effect uniform heating of the material in said chamber, and motor means connected to rotate said turntable.

3. A high frequency heater comprising walls made of electrically conducting material forming a rectangular heating chamber, a high frequency supply source connected to said chamber for producing standing electromagnetic field waves in said chamber in accordance with a predetermined mode for heating a material in said chamber, a turntable in said chamber for supporting a material to be heated mounted for rotation about an axis displaced from the center of said chamber thereby to effect uniform heating of the material, motor means connected to rotate said turntable, said walls being provided with a door opening, a door made of electrically conducting material mounted for slidable movement in front of said opening, a treadle for operating said door, and means responsive to movement of said door for controlling the supply of power from said source to said chamber.

4. A high frequency heater comprising walls made of electrically conducting material forming a heating chamber, high frequency power supply means connected to said chamber for producing standing electromagnetic field waves in said chamber for heating a material placed in said chamber, said walls being provided with a door opening, a wave trap wall around said door opening having a width of at least approximately one-quarter of the length of said waves, a door made of electrically conducting material mounted for movement to a closed position in a predetermined spaced relation with said wave trap wall in front of said door opening with its edges overlapping said door opening on all sides an amount at least approximately one-quarter of the length of said waves whereby said door when in closed position forms with said wave trap wall a high frequency wave trap preventing the loss of power from said chamber.

5. A high frequency heater comprising walls made of electrically conducting material forming a heating chamber, a high frequency supply source having a predetermined wave length in air connected to said chamber for producing standing electromagnetic field waves in said chamber for heating a material in said chamber, said walls being provided with a door opening, a flange around said door opening having a width of at least approximately one-quarter of said wave length, a door made of electrically conducting material mounted for movement to a closed position in a predetermined spaced relation with said flange in front of said door opening with its edges overlapping said door opening on all sides an amount at least approximately one-quarter of said wave length whereby said door when in said closed position forms with said flange a high frequency wave trap preventing the loss of power from said chamber.

6. A high frequency heater comprising walls made of electrically conducting material forming a heating chamber, a high frequency supply source having a predetermined wave length in air connected to said chamber for producing standing electromagnetic field waves in said chamber for heating a material in said chamber, said walls being provided with a door opening, a flange around said door opening having a width at least approximately one-quarter of said wave length, a door made of electrically conducting material mounted for sliding movement in a predetermined spaced relation with said flange to a closed position in front of said door opening with its edges overlapping said door opening on all sides an amount at least as great as one-quarter of said wave length whereby said door when in said closed position forms with said flange a high frequency wave trap preventing the loss of energy from said chamber.

7. An ultrahigh frequency heater comprising walls made of electrically conducting material forming a heating chamber, a high frequency supply source having a predetermined wave length in air connected to said chamber for producing standing electromagnetic field waves in said chamber for heating a material in said chamber, said walls being provided with a door opening, a wave trap wall around said door opening having a width at least approximately one-quarter of said wave length, a biased open door made of electrically conducting material mounted for sliding movement in a predetermined spaced relation with said wave trap wall to a closed position in front of said door opening with its edges overlapping said door opening an amount at least as great as one-quarter of said wave length whereby said door when in said closed position forms with said wave trap wall a high frequency wave trap preventing the loss of power from said chamber, a treadle for moving said door to said closed position, a latch for securing said door in said closed position, a biased open switch mounted to be engaged by said door so as to be closed when said door is moved to said closed position, means controlled by said switch for controlling said supply source to supply power to said chamber when said switch is closed, and time operated means for releasing said latch for opening movement of said door after a predetermined heating time interval whereupon said switch opens in accordance with its bias to discontinue the supply of power to said chamber.

8. A high frequency heater comprising walls made of electrically conducting material forming a heating chamber, a magnetron, a tubular conductor connecting said heating chamber to said magnetron for conducting power in wave form from said magnetron to said chamber thereby to produce standing electromagnetic field waves in said chamber for heating a material in said chamber, said field waves being in accordance with a predetermined mode, a turntable in said chamber for supporting the material to be heated displaced from the center of said chamber, a partition made of low power loss dielectric material extending across said chamber between said turntable and the connection with said tubular conductor, one of said walls being provided with apertures adjacent said turntable, and means for exhausting vapors from said chamber through said apertures.

9. A high frequency heater comprising walls made of electrically conducting material forming a heating chamber, a magnetron, a tubular conductor connecting said heating chamber to said magnetron for conducting power in wave form from said magnetron to said chamber thereby to produce standing electromagnetic field waves in said chamber for heating a material in said chamber, the said chamber having one dimension less than approximately one-half wavelength and the said electromagnetic field being arranged in the chamber so that the electric field component thereof is substantially parallel to this dimension, said field waves being in accordance with a predetermined mode providing a high voltage electric field point displaced from the center of said chamber, an adjustable power matching plug substantially concentric with said high voltage point extending into said chamber, and a turntable in said chamber for supporting the material to be heated displaced from the center of said chamber.

10. A high frequency heater comprising walls made of electrically conducting material forming a heating chamber, a magnetron, a tubular conductor connecting said heating chamber to said magnetron for conducting power in wave form from said magnetron to said chamber thereby to produce standing electromagnetic field waves in said chamber for heating a material in said chamber, said field waves being in accordance with a predetermined mode providing a high voltage electric field point displaced from the center of said chamber and adjacent the connection between said tubular conductor and said chamber, an adjustable power matching plug substantially concentric with said high voltage point extending into said chamber, a turntable in said chamber for supporting the material to be heated displaced from the center of said chamber, a partition made of low power loss dielectric material extending across said chamber between said turntable and said plug and said connection with said tubular conductor, said chamber being provided with apertures in its wall above said turntable, and means for exhausting vapors from said chamber through said apertures.

11. A high frequency heater comprising walls made of electrically conducting material forming a chamber, high frequency supply means connected to said chamber for producing standing electromagnetic field waves in said chamber, the said chamber having one dimension less than approximately one-half wave length and the said electromagnetic field waves being arranged in the chamber so that the electric field is predominantly oriented in the direction of this dimension, a support in said chamber for the material to be heated mounted for rotation about an axis substantially parallel with the direction of said electric field in such position as to pass all parts of the material through substantially the same aggregate electro-magnetic field thereby to effect uniform heating of the material in said chamber, and driving means connected to rotate said support.

12. A high frequency heater comprising walls made of electrically conducting material forming a rectangular chamber having a transverse dimension shorter than other transverse dimensions, high frequency supply means connected to said chamber for producing standing electromagnetic field waves in said chamber, the said shorter transverse dimension of said chamber being less than approximately one-half wavelength and the said waves providing an electric field substantially parallel with said shorter transverse dimension, a support in said chamber for the material to be heated mounted for rotation about an axis substantially parallel with said shorter transverse dimension thereby to effect uniform heating of the material in said chamber, and driving means connected to rotate said support.

13. An ultrahigh frequency heater comprising walls made of electrically conducting material forming a heating chamber, high frequency supply means having a predetermined wave length in air connected to said chamber for producing standing electromagnetic field waves in said chamber for heating a material in said chamber, said walls being provided with a door opening, a wave trap wall around said door opening having a width at least approximately one-quarter of said wave length, a door made of electrically conducting material mounted for sliding movement in a predetermined spaced relation with said wave trap wall to a closed position in front of said door opening with its edges overlapping said door opening an amount at least as great as one-quarter of said wave length whereby said door when in said closed position forms with said wave trap wall a high frequency wave trap preventing the loss of power from said chamber, a treadle for operating said door, and means responsive to movement of said door for controlling the supply of power from said source to said chamber.

HENRY E. REVERCOMB.
PHILIP W. MORSE.

REFERENCES CITED

The following references are of record in the file of this patent:

UNITED STATES PATENTS

| Number | Name | Date |
| --- | --- | --- |
| 1,972,050 | Davis | Aug. 28, 1934 |
| 2,263,681 | Hart | Nov. 25, 1941 |
| 2,407,690 | Southworth | Sept. 17, 1946 |
| 2,427,094 | Evans | Sept. 9, 1947 |
| 2,438,912 | Hansen et al. | Apr. 6, 1948 |
| 2,438,914 | Hansen | Apr. 6, 1948 |
| 2,442,451 | Albin | June 1, 1948 |
| 2,467,230 | Revercomb et al. | Apr. 12, 1949 |
| 2,467,292 | Burrows | Apr. 12, 1949 |
| 2,495,170 | Kinn | Jan. 17, 1950 |
| 2,495,435 | Welch | Jan. 24, 1950 |
| 2,497,670 | Hanson et al. | Feb. 14, 1950 |
| 2,500,676 | Hall et al | Mar. 14, 1950 |

OTHER REFERENCES

Abstract—737,963 published in O. G. of January 22, 1952, vol. 654, page 1152.

Radar Electronics Fundamentals, Bureau of Ships, Navy Dept., June 1944.

"Magnetron Adapted to Cooking Purposes," Electrical Engineering, December 1946, page 591.

"Engineering Abstracts," Product Engineering January 1947, pages 137–140.

Morse et al., "UHF Heating of Frozen Foods," Electronics, October 1947, pages 85–89.